United States Patent [19]

Ives

[11] Patent Number: 4,660,738

[45] Date of Patent: Apr. 28, 1987

[54] LEAK-RESISTANT FIBERGLASS TANK AND METHOD OF MAKING THE SAME

[76] Inventor: Frank E. Ives, 26601 Dover Ct., Kent, Wash. 98031

[21] Appl. No.: 822,865

[22] Filed: Jan. 27, 1986

Related U.S. Application Data

[63] Continuation-in-part of Ser. No. 715,953, Mar. 25, 1985, Pat. No. 4,602,722.

[51] Int. Cl.⁴ .............................................. B65D 6/00
[52] U.S. Cl. .................................... 220/414; 220/1 B; 220/5 A
[58] Field of Search ................ 220/414, 1.5, 5 A, 1 B, 220/403, 450, 453, 454, 463, 470

[56] References Cited

U.S. PATENT DOCUMENTS

| | | | |
|---|---|---|---|
| 2,614,058 | 10/1952 | Francis | 154/83 |
| 2,723,705 | 11/1955 | Collins | 154/1.7 |
| 2,798,510 | 7/1957 | Martin et al. | 138/78 |
| 2,877,150 | 3/1959 | Wilson | 154/83 |
| 3,247,869 | 4/1966 | Boegershausen et al. | 138/144 |
| 3,372,075 | 3/1968 | Holt et al. | 156/172 |
| 3,392,865 | 7/1968 | Dryden | 220/414 |
| 3,545,495 | 12/1970 | Falcomato et al. | 138/144 |
| 3,737,092 | 6/1973 | Rausing | 220/450 |
| 4,081,302 | 3/1978 | Drostholm et al. | 156/90 |
| 4,602,722 | 7/1986 | Ives | 220/414 |

Primary Examiner—Steven M. Pollard
Attorney, Agent, or Firm—Christensen, O'Connor, Johnson & Kindness

[57] ABSTRACT

A tank for use in storing volatile liquids and, in particular, petroleum distillates, such as gasoline in an underground environment, includes a fiberglass outer wall lined with a corrosion-resistant impervious film liner that substantially covers the entire interior surface of the fiberglass tank. In a preferred method of constructing the tank, a lay-up mandrel has an end cap of the film placed over a first end thereof and pressed to fit closely the exterior surface topography of the mandrel. A strip of film is laid down on the mandrel overlying at least a portion of the end cap and the film strip is wound in a helical fashion such that at least portions of adjacent coils of the helix overlap one another until the mandrel is essentially completely covered by the film. The polyester resin and glass fibers are then laid down over the film and cured in place. The mandrel is then removed, leaving a film-lined fiberglass tank. In a preferred embodiment, the film is comprised of polyvinylfluoride or polyester terephthalate.

5 Claims, 5 Drawing Figures

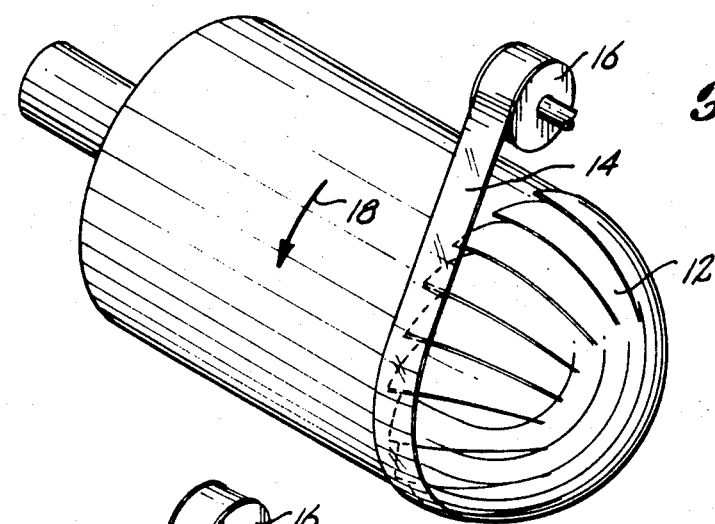
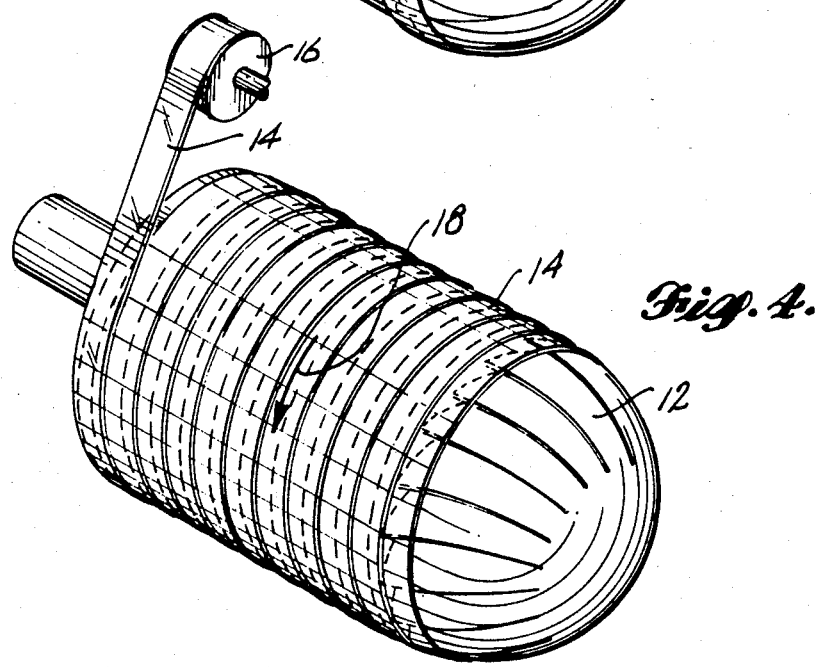
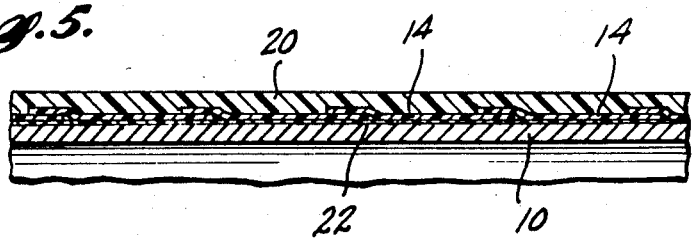

LEAK-RESISTANT FIBERGLASS TANK AND METHOD OF MAKING THE SAME

BACKGROUND OF THE INVENTION

This application is a continuation-in-part of application Ser. No. 715,953 filed Mar. 25, 1985 now U.S. Pat. No. 4,062,722.

This invention relates to fiberglass tanks and, in particular, fiberglass tanks used in underground applications for holding gasoline and other volatile substances.

In recent years the trend has been to store gasoline and other fuels at service stations in underground tanks made of fiberglass. Many of the metal tanks that have been installed in past years have now begun to leak due to corrosion and are being replaced with fiberglass tanks because of the inherent resistance of the fiberglass to moisture-caused corrosion in underground applications. Recently, the Environmental Protection Agency has proposed the elimination of lead as an octane-boosting additive in gasoline. In order to maintain sufficiently high octane ratings for gasoline it will be necessary for the industry to mix some other additive with the gasoline. One likely candidate for such addition to the gasoline is methyl alcohol or methanol, which is a by-product of the gasoline distillation process and could easily be added to the gasoline end product. One of the problems with using methanol as an additive in gasoline and storing that gasoline in fiberglass tanks is that methanol is an aggressive solvent and will react with the fiberglass, causing deterioration of the fiberglass tank wall from the inside even though the fiberglass resists exterior corrosion. The methanol also has an affinity for water, which always tends to gather in underground tanks and the mixture of the methanol in the water makes an even more aggressive solvent that deteriorates the walls of the fiberglass tank causing leaks and failures in the underground tank.

It is therefore an object of the present invention to provide a fiberglass tank primarily for use in underground applications for the storage of gasoline and other volatile materials that is resistant to the deterioration of the tank walls because of the volatility of the solvent.

SUMMARY OF THE INVENTION

In accordance with the above-stated objects, the invention provides a fiberglass tank having a liner on the interior of said tank comprised of a substantially moisture impervious layer of metal foil or a nonmetallic film that is resistant to substantially all types of solvents. In the remainder of the specification, the liner is referred to as a "film" but it is to be understood that the term "film" is to include both metallic foils and nonmetallic films. In the preferred method of constructing the tank, a mandrel is covered with a layer of the film and layers of resin and glass fiber are overlayed on the film and cured to a solid state. The mandrel is removed having a rigid tank that includes a fiberglass outer wall and a lining of the film on the inner wall. The film can be applied to the mandrel in many different ways. The preferred method is to lay the film on the mandrel in strips laid down in a helical pattern with adjacent coils of the helix overlapping one another to provide complete coverage of the mandrel by the film. In one embodiment of the invention, an end cap covers the end of the mandrel and the end cap is at least partially overlapped by the film strips wound around the remainder of the mandrel to provide a complete covering of the mandrel by the film.

The film liner can be comprised of any one of many different materials. A liner of metal foil, such as aluminum or stainless steel will provide the desired imperviousness and is resistant to corrosion from the gasoline and methanol. However, a nonmetallic liner can also be used to provide a noncorrosive interior liner that is resistant to the corrosive effects of the gasoline and also resists corrosion from other materials such as acids or caustics, such as sodium hydroxide. In most locations, it is necessary to obtain approval from local authorities, usually a fire marshal, before installing underground gasoline storage facilities. Since most local governments do not have the budget available to develop their own testing and approval mechanisms, they rely on national testing concerns such as Underwriter's Laboratories (U.L.) to test tanks of manufacturers. The local authorities then approve or disapprove installation based on the results of the U.L. tests. Part of the U.L. test for underground gasoline tanks includes immersion in class A and class B liquids, which includes both acids and caustics. These acid and caustic solutions can have a detrimental effect on metals used as liners, for example aluminum and, therefore, it is nearly impossible to achieve passage of the U.L. tests using a metal foil liner.

In order to provide corrosion resistance against acids and caustics, the liner can be constructed of a film made of a polymer material such as polyvinylfluoride or a polyester terephthalate such as that available from E.I. du Pont de Nemours and Company under the name Mylar. A suitable film has been found to be a 2 mil thick film of polyvinylfluoride, which is available under the name Tedlar from E. I. du Pont de Nemours & Company. The polyvinylfluoride film is also resistant to well-known organic solvents such as methyl ethyl ketone and acetone. Lately, these two solvents have been appearing more and more in gasoline compositions, apparently being placed there by companies as a means to dispose of unwanted quantities of these solvents that have been used in industry and recovered as a part of the toxic waste cleanup effort.

BRIEF DESCRIPTION OF THE DRAWINGS

The advantages of the present invention will be better understood by those of ordinary skill in the art and others upon reading the ensuing specification when taken in conjunction with the appended drawings wherein:

FIG. 3 is an isometric view of the mandrel of FIG. 1 with the end cap in place and a strip of film being applied to the mandrel;

FIG. 4 is an isometric view of the mandrel at a time later than that shown in FIG. 3 with the film applied substantially to the entire surface of the mandrel; and FIG. 5 is a cross-sectional view of a portion of the tank wall of a tank made in accordance with the principles of the present invention while still on the mandrel.

DETAILED DESCRIPTION OF THE PREFERRED EMBODIMENT

Figure 1:
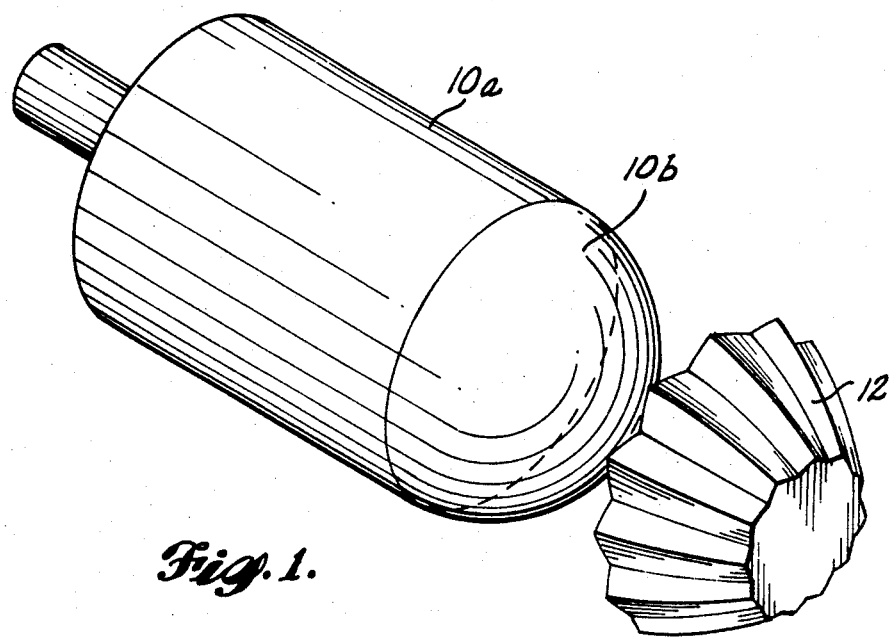
FIG. 1 is an isometric view of a mandrel and an end cap used in the construction of a fiberglass tank in accordance with the principles of the present invention.
Figure 2:
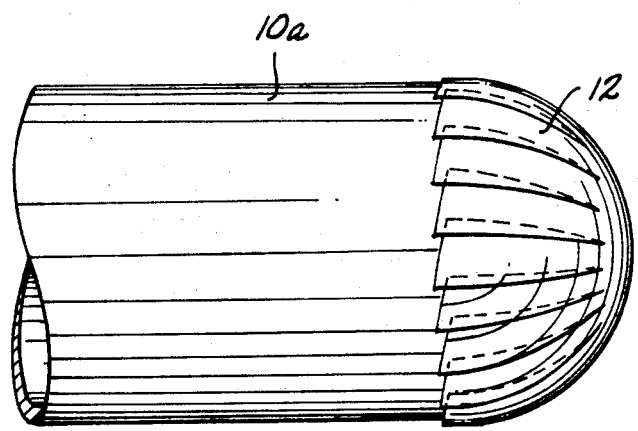
FIG. 2 is a side elevational view of the mandrel of FIG. 1 with the end cap placed in position on the mandrel.

Referring to FIG. 1, a film end cap 12 is shown prior to its placement on the hemispherical portion 10b of the mandrel 10. The end cap 12 is shown in position on the mandrel in FIG. 2. In order to accommodate for the curvature of the portion 10b, the end cap 12 has several pleats formed therein which are folded down flat against the outer surface of the hemispherical portion 10b so that the entire hemispherical portion 10b is covered by the film. The end cap is pressed into place either manually or by the use of a press to conform it to the curved surface of the portion 10b. Alternatively, the film could be applied in a patchwork manner in successive strips to eventually cover the entire end portion 10b of the mandrel.

In FIG. 3, a continuous strip 14 of film of the same type as the end cap 12 is shown being placed on the mandrel 10 form a feed spool 16. The mandrel is rotated as shown by the arrow 18, and the film strip 14 is fed from the spool 16 to encompass the entire outer perimeter of the mandrel. As shown in FIG. 4, the spool moves longitudinally with respect to the mandrel as the mandrel is rotated to lay down a continuous helical covering of film on the surface of the mandrel. The speed of the rotation of the mandrel and the longitudinal movement of the spool are coordinated so that there is an overlap of the adjacent coils of the helically wound film strips as they surround the mandrel so that there is complete coverage of the mandrel by the film with no gaps between adjacent helical coils of the strip. The film strip 14 overlies the end portion of the end cap 12 so that there is no gap in coverage of the film on the mandrel.

After the mandrel 10 has been completely covered by the film end cap 12 and film strip 14, resin and glass fibers are laid over the mandrel in a conventional manner to form the fiberglass outer shell of the tank. FIG. 5 illustrates a cross section of the tank wall after the fiberglass has been formed. It can be seen that the strips 14 of film are now coated by a fiberglass layer 20 which is also bonded to the strips 14 and the entire assembly rests on the outer surface of the mandrel 10. Typically, some parting agent 22, such as a sheet of polytetrafluoroethylene, for example, that is made and sold under the trademark TEFLON, or a polyester terephthalate such as Mylar, both available from by E. I. du Pont de Nemours & Company, is laid down over the surface of the mandrel prior to application of the film strips in end cap to aid in the separation of the tank wall from the mandrel after the fiberglass has been put down and cured. The mandrel and parting agent are then removed, leaving a tank lined with a layer of the film. The gasoline-methanol mixture or other liquid being stored in the tank contacts only the film liner, which is resistant to corrosion, rather than directly contacting the fiberglass, which can be deteriorated by contact with certain solvents. Resin from the fiberglass-forming operation will seep into the space between adjacent overlapping strips of film. The seepage of the resin between the edges of the film strips tends to both keep the film in place on the tank wall and also to provide a barrier to leakage of the gasoline through the seams of the film. Some gasoline in the tank may seep into the overlapped seam area between strips and contact the resin contained therein. However, due to the small surface area of resin exposed to the gasoline at the film strip interfaces, the corrosive effect of the solvent within the tank on the resin at the overlap areas will be minimal. The tank, therefore, is substantially resistant to the corrosive effects of the solvent stored within the tank and therefore resistant to leakage caused by solvent corrosion. The leak resistance is accomplished without any reduction in the basic strength of the fiberglass exterior shell, which prevents damage to the tank due to abrasion and piercing from the outside.

While the particular method of forming a fiberglass tank having a corrosion-resistant inner lining for underground storage of gasoline has been disclosed herein, it will be understood by those of ordinary skill in the art and others that modifications can be made to the tank itself and the method of forming the tank while remaining within the spirit and scope of the present invention. While the tank of the present invention was wound on a mandrel with a hemispherical end portion, other shapes of tanks could also be formed, in which case, the precise shape of the end cap may be different from that illustrated and described. In fact it may be that the need for an end cap may be eliminated. Also, the film in the presently disclosed method was laid down in overlapping, helically wound strips; however, the film could also be placed down in a single large sheet depending on the size of the tank being formed and the desires of the fabricator. Alternatively, the film could be laid down in parallel adjacent annular strips rather than in a helix or perhaps sprayed onto the mandrel. The important feature to realize is that the film lining of the tank be sufficiently complete so that there is substantially no direct contact between the liquid being stored within the tank and the fiberglass wall of the tank. Since changes can be made to the illustrated and described embodiment and method, the invention should be defined solely with reference to the claims that follow.

The embodiments of the invention in which an exclusive property or privilege is claimed are defined as follows:

1. A tank for the underground storage of petroleum distillate products having a fiberglass wall and an inner lining substantially completely covering the interior of said tank, said inner lining including a plurality of adjacent partially overlapping strips of corrosion-resistant film having resin between the overlapping portions of adjacent film strips and having the ends of the tank lining comprised of end caps constructed and arranged to accommodate the curvature of the ends of the tank, wherein the end caps are constructed and arranged with pleats, said pleats being foldable to conform to the shape of the end of the tank.

2. The tank of claim 1, wherein the adjacent strips of film are coils of a continuous helically wound strip of film.

3. The tank of claim 1, wherein said film is comprised of polyvinylfluoride.

4. The tank of claim 1, wherein said film is comprised of polyester terephthalate.

5. The tank of claim 1, wherein said lining comprises a plurality of parallel, annularly wound strips of film.

* * * * *